(12) United States Patent
Lee

(10) Patent No.: US 11,407,337 B2
(45) Date of Patent: Aug. 9, 2022

(54) VEHICLE SEAT RECLINER

(71) Applicant: DAS Co., Ltd., Gyeongsangbuk-do (KR)

(72) Inventor: Sang Jun Lee, Ulsan (KR)

(73) Assignee: DAS CO., LTD., Gyeongsangbuk-Do (KR)

(*) Notice: Subject to any disclaimer, the term of this patent is extended or adjusted under 35 U.S.C. 154(b) by 0 days.

(21) Appl. No.: 17/090,516

(22) Filed: Nov. 5, 2020

(65) Prior Publication Data

US 2021/0162892 A1 Jun. 3, 2021

(30) Foreign Application Priority Data

Nov. 29, 2019 (KR) ........................ 10-2019-0157351

(51) Int. Cl.
*B60N 2/22* (2006.01)
*B60N 2/02* (2006.01)

(52) U.S. Cl.
CPC ......... *B60N 2/2213* (2013.01); *B60N 2/0232* (2013.01); *B60N 2002/0236* (2013.01)

(58) Field of Classification Search
CPC ................ B60N 2/2252; B60N 2/2213; B60N 2002/0236
See application file for complete search history.

(56) References Cited

U.S. PATENT DOCUMENTS

| 5,524,970 | A * | 6/1996 | Kienke | B60N 2/2255 |
| | | | | 297/362 |
| 6,619,743 | B1 * | 9/2003 | Scholz | B60N 2/2254 |
| | | | | 297/362 |
| 7,281,765 | B2 * | 10/2007 | Scholz | B60N 2/2254 |
| | | | | 297/362 |
| 8,360,525 | B2 * | 1/2013 | Cha | B60N 2/0232 |
| | | | | 297/362 |
| 2002/0187045 | A1 | 12/2002 | Ijima et al. | |

FOREIGN PATENT DOCUMENTS

| KR | 101569625 | A | 11/2015 |
| KR | 101659231 | B1 | 9/2016 |
| KR | 101709599 | B1 | 2/2017 |
| KR | 101799760 | B1 | 11/2017 |

OTHER PUBLICATIONS

Korean Notice of Allowance for Application No. 10-2019-0157351 dated Mar. 30, 2021.
Korean Office Action for Application No. 10-2019-0157351 dated Dec. 21, 2020.

* cited by examiner

*Primary Examiner* — David R Dunn
*Assistant Examiner* — Tania Abraham
(74) *Attorney, Agent, or Firm* — Tarolli, Sundheim, Covell & Tummino LLP

(57) ABSTRACT

Disclosed herein is a vehicle seat recliner. A center boss of an external gear includes a first end and a second end having a larger diameter than the first end. Since the load of the center boss is easily distributed, it is possible to secure smooth operation performance by preventing the deformation of the center boss even though a strong external force is applied to the recliner. Since there is no need to perform heat treatment on the center boss for securing the strength thereof, manufacturing costs are reduced.

4 Claims, 4 Drawing Sheets

[FIG. 1]
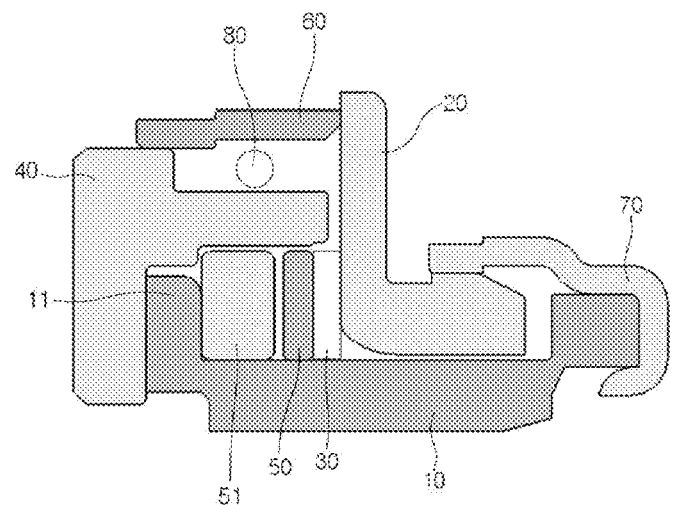
[FIG. 2]
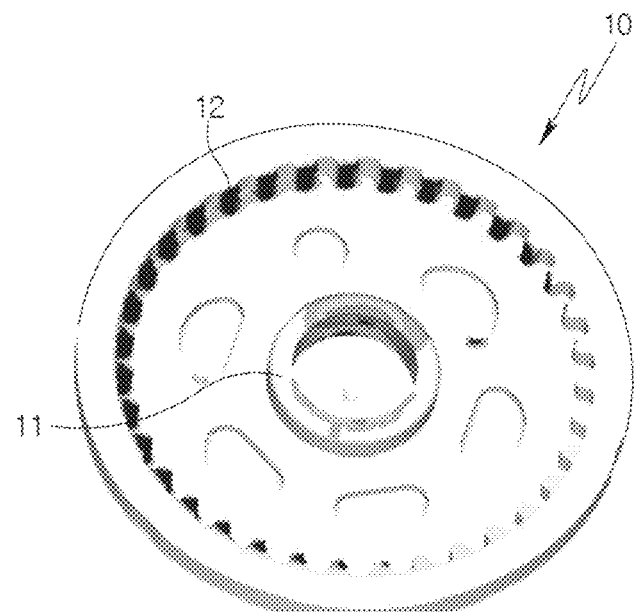

[FIG. 3]
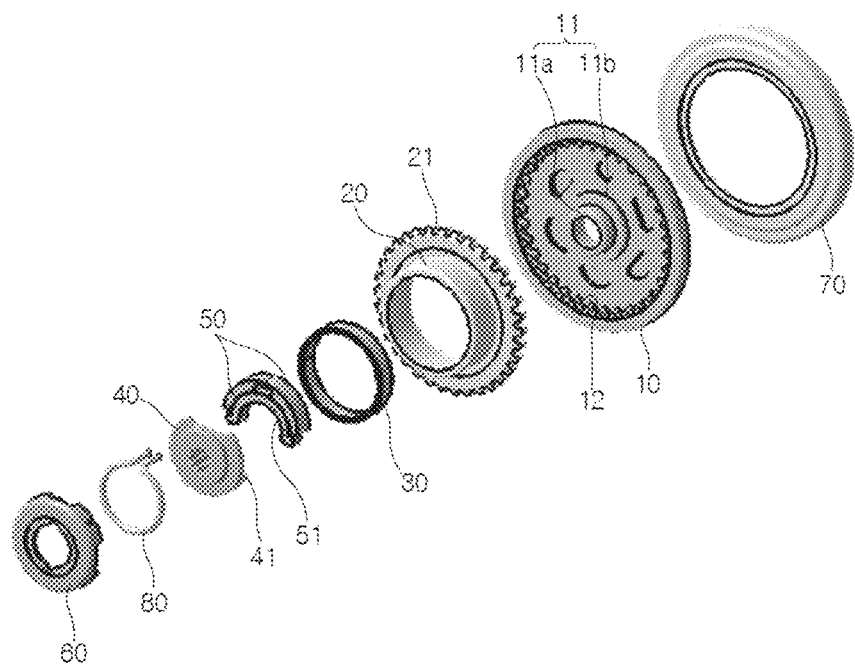
[FIG. 4]
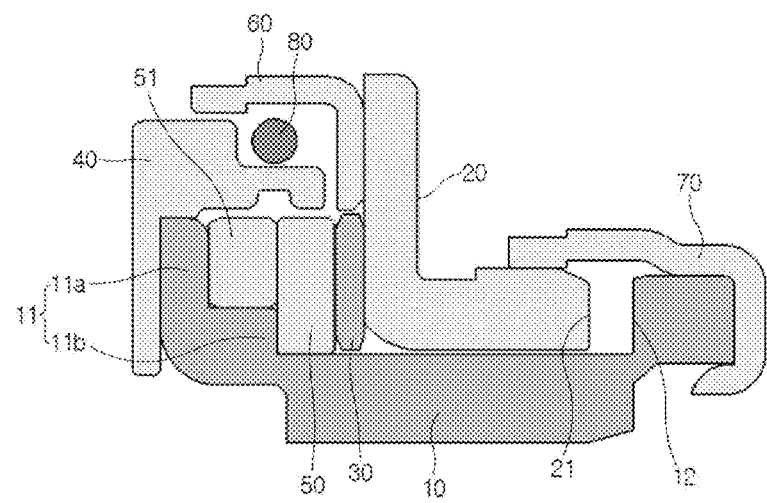

[FIG. 5]
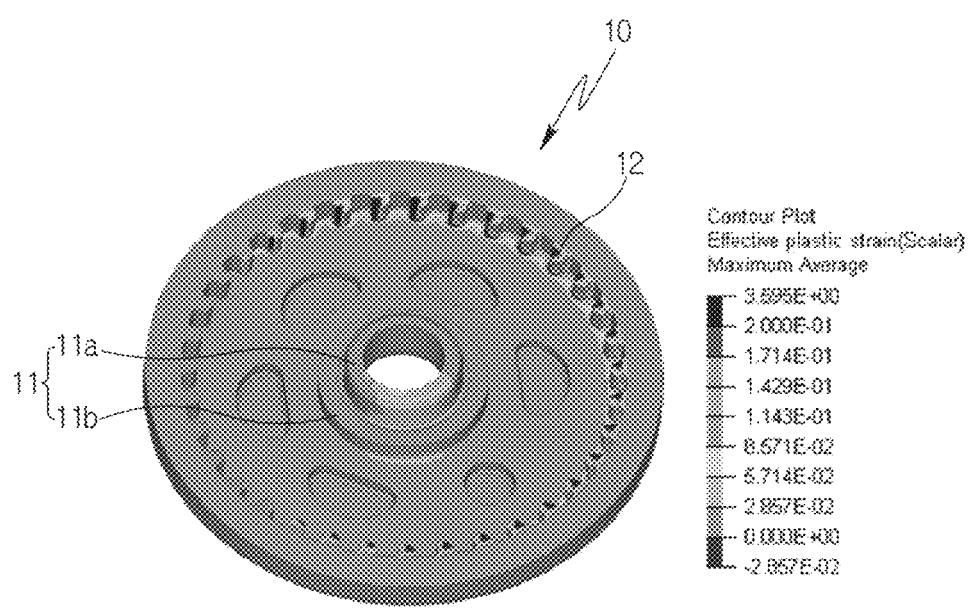

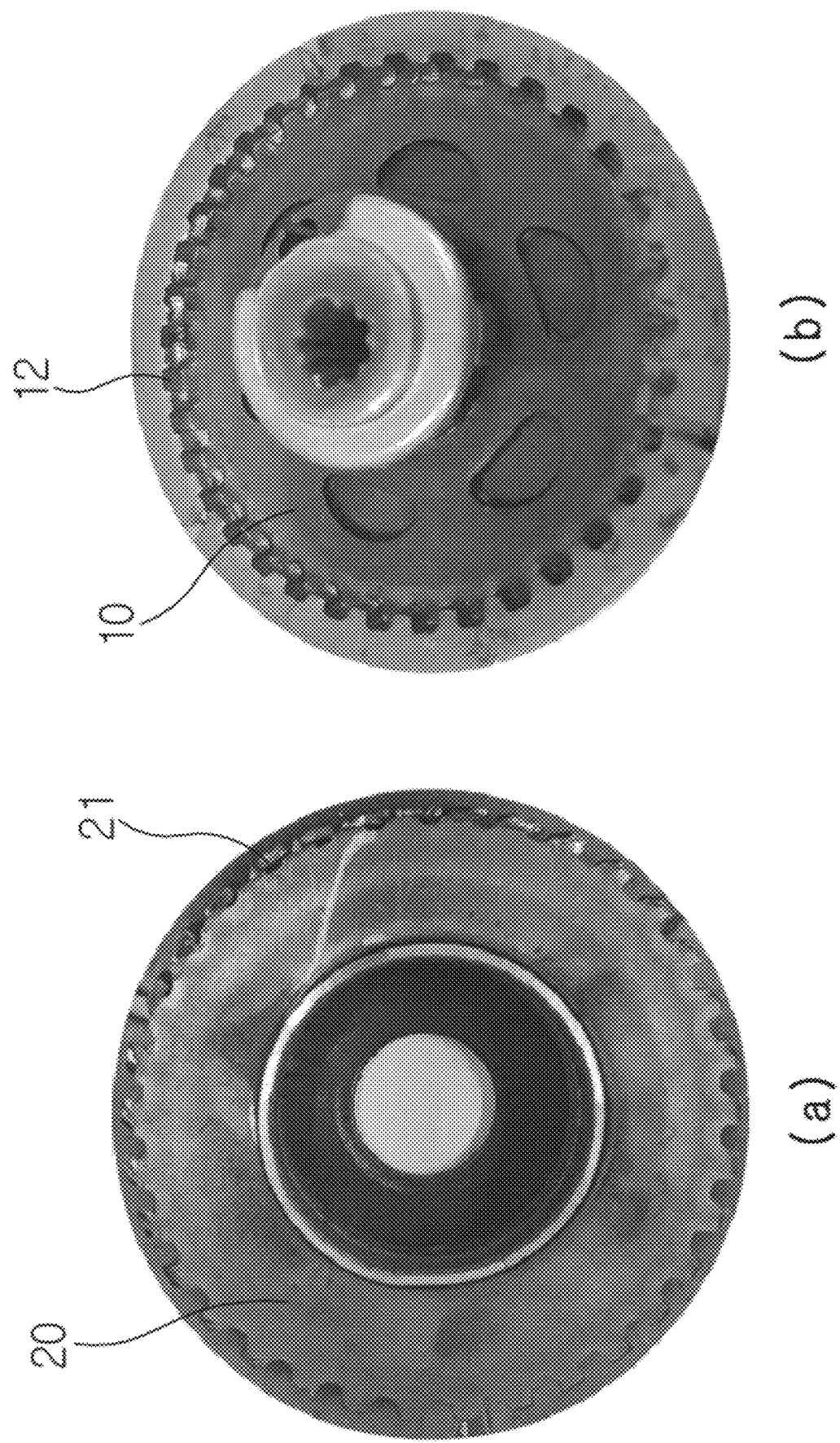
[FIG. 6]

US 11,407,337 B2

VEHICLE SEAT RECLINER

CROSS-REFERENCE TO RELATED APPLICATION

This application claims priority to Korean Patent Application No. 10-2019-0157351, filed on Nov. 29, 2019, the disclosure of which is incorporated herein by reference in its entirety.

BACKGROUND

Technical Field

Exemplary embodiments of the present disclosure relate to a vehicle seat recliner, and more particularly, to a vehicle seat recliner that is installed at a connection between a seat cushion and a seat back so as to be able to fix or adjust an angle of the seat back.

Description of the Related Art

A vehicle seat is typically equipped with a recliner configured to rotatably connect a seat back to a seat cushion and to switch between a locked state in which the seat back is fixed at a predetermined angle and an unlocked state in which the seat back is rotatable. That is, an occupant may adjust the angle of the seat back according to her/his body type or convenience by operating the recliner.

Examples of the recliner include a lever-type recliner in which the angle of a seat back is adjusted in a manner that, when an operating lever is operated, the seat back is unlocked and pushed by an occupant's back, and a rotary-type recliner in which the angle of a seat back is adjusted by turning a dial-type operating knob. The rotary-type recliner may be electrically actuated by a motor connected to its rotary shaft.

FIG. 1 is a half cross-sectional view illustrating an assembled state of a conventional recliner. As illustrating in the drawing, the recliner includes external and internal gears 10 and 20 inscribed with each other, a bush 30 fixedly inserted into the internal gear 20, a socket 40 rotatably inserted into a center boss 11 of the external gear 10, a pair of wedges 50 installed between the bush 30 and the center boss 11 of the external gear 10, a cam sliver 51 installed between the wedges 50 and the center boss 11 of the external gear 10, a cover plate 60 fixed to one side of the internal gear 20 to prevent the separation of components such as the socket 40 and the wedge 50, a guide ring 70 fixed to surround the outer periphery of the external gear 10 to prevent the separation of the internal gear 20, and a spring 80 installed on one side of the socket 40, having a circular ring shape open at one side thereof, and configured to apply force in a direction that both wedges 50 are always away from each other by inserting both bent ends of the spring 80 between the wedges 50.

When a motor rotates a shaft connected to the socket 40, the socket 40 allows the internal gear 20 to be rotated (including both revolution and rotation motions) through the wedges 50 in the external gear 10 and the external gear 10 is thus rotated according to the gear ratio of the two gears. In this way, the angle of a seat back is adjusted.

When an external force (occupant's reclining force) is applied to the seat back in a normal state in which the motor is not actuated, one of the wedges 50, which is opposite to the direction of action of the external force, is fitted between the center boss 11 and the bush 30 through the cam sliver 51, thereby suppressing the rotation of the external gear 10 relative to the internal gear 20. In this way, the angle of the seat back is kept fixed.

Meanwhile, the recliner must have strength to maintain the seat back in a stable fixed state against the impact load, which is applied to the seat back in the event of collision accidents, as well as the load caused by an occupant reclining on the seat back as usual. Among the constituent components of the recliner, the components whose strength is important are gear teeth and the center boss 11 of the external gear 10.

FIG. 2 is a diagram illustrating a state of stress generated in the external gear 10 when the recliner is operated, and illustrates the magnitude of the stress that increases from blue to red. It can be seen that, during the operation of the recliner, a strong stress is generated in the toothed portion of the external gear 10 engaged with the internal gear 20 and a strong stress is also generated in the center boss 11 as if the stress is represented as colors from blue to yellow through green.

The center boss 11 is a component that finally supports the external force transmitted through the seat back maintained in a locked state and guides the operation of the socket 40, wedges 50, and cam sliver 51. If the strength of the center boss 11 is insufficient, the center boss 11 is deformed by an external force applied thereto, which may lead to poor operation of the recliner.

Accordingly, the external gear 10 has been manufactured by increasing the thickness of the center boss 11, performing heat treatment thereon, or using special alloy steel having excellent strength by itself.

However, increasing the thickness of the center boss 11 to secure the strength thereof may cause a reduction in installation space of other components and a deterioration in shape workability of the center boss 11 itself (the center boss 11 being formed by burring). In addition, performing the heat treatment on the center boss 11 or using the special alloy steel for the center boss 11 may cause an increase in manufacturing cost.

[Patent Document] Korean Patent No. 10-1569625 (Nov. 10, 2015)

SUMMARY

The present disclosure has been made in view of the above-mentioned problems, and an object of the present disclosure is to provide a vehicle seat recliner capable of being manufactured at low cost, as well as having normal operation performance by preventing deformation of a center boss through an improvement in workability of the center boss whose strength is sufficiently secured by methods other than increasing a thickness of the center boss, performing heat treatment on the center boss, and using a high-strength material for the center boss.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an aspect of the present disclosure, there is provided a vehicle seat recliner that includes external and internal gears inscribed with each other, a socket rotatably inserted into a center boss of the external gear and connected to a shaft rotated by a motor, and a pair of wedges installed between the center boss of the external gear and the internal gear to mutually constrain them or release a constrained state thereof, wherein the center boss of the external gear has a multi-stage structure with a stepped outer peripheral surface.

The outer peripheral surface of the center boss may include a first end and a second end having a larger outer diameter than the first end.

The vehicle seat recliner may further include a cam sliver installed between the first end and the wedges, the cam sliver being in contact with only an outer peripheral surface of the first end.

The wedges may be in contact with both an outer peripheral surface of the cam sliver and an outer peripheral surface of the second end.

Each of the cam sliver and the wedges may have a length that does not protrude outward from the tip of the first end.

The cam sliver may have lower ends bent radially outward to support lower ends of the wedges.

The vehicle seat recliner may further include a circular ring-shaped spring that is open at one side thereof and installed on one side of the socket, both ends of the spring being bent and extended to be inserted between the pair of wedges so that the spring pushes the wedges in a direction away from each other.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a half cross-sectional view illustrating an assembled state of a conventional recliner;

FIG. 2 is a stress distribution diagram of an external gear as one component of the conventional recliner;

FIG. 3 is an exploded perspective view illustrating a recliner according to the present disclosure;

FIG. 4 is a half cross-sectional view illustrating an assembled state of the recliner according to the present disclosure;

FIG. 5 is a stress distribution diagram of an external gear as one component of the recliner according to the present disclosure; and FIG. 6(a) is a photograph of an internal gear whose gear teeth are damaged by a failure mode test of the recliner, and FIG. 6(b) is a photograph of an external gear whose gear teeth are damaged by the same test.

DESCRIPTION OF SPECIFIC EMBODIMENTS

The present disclosure may be subjected to various modifications and have various embodiments. Specific embodiments will be illustrated in the drawings and described in the detailed description of the present disclosure. However, this is not intended to limit the present disclosure to specific embodiments. It should be understood that the present disclosure includes all modifications, equivalents or replacements that fall within the spirit and technical scope of the present disclosure, and the scope of the present disclosure is not limited to the following embodiments. It should be considered that the thickness of each line or the size of each component in the drawings may be exaggeratedly illustrated for clarity and convenience of description.

In addition, the terms used in the specification are terms defined in consideration of functions of the present disclosure, and these terms may change depending on the intention or practice of a user or an operator. Therefore, these terms should be defined based on the overall disclosures set forth herein.

Exemplary embodiments of the present disclosure will be described below in detail with reference to the accompanying drawings.

As illustrated in FIGS. 3 and 4, a recliner includes an external gear 10, an internal gear 20, a bush 30, a socket 40, a pair of wedges 50, and a cam sliver 51 to support the wedges 50, a cover plate 60, a guide ring 70, and a spring 80.

The external gear 10 has a circular center boss 11 formed at the center thereof, and teeth 12 formed on the inner peripheral surface of the edge thereof. The internal gear 20 has teeth 21 formed on the outer peripheral surface of the edge thereof.

The internal gear 20 is inserted into and seated on the external gear 10, in which state the teeth 12 and 21 of both gears are engaged with each other. That is, the external gear 10 and the internal gear 20 are inscribed with each other.

Compared the external gear 10, the internal gear 20 has a smaller outer diameter and a smaller number of teeth. Thus, the external gear 10 is eccentric from the internal gear 20, and the internal gear 20 revolves and rotates in the external gear 10. By the rotation of the internal gear 20, the external gear 10 rotates slowly compared to the internal gear 20 at a speed reduced according to the gear ratio of both gears.

The internal gear 20 has the circular bush 30 fixedly inserted into the inner diameter portion thereof, so that the internal gear 20 and the bush 30 are integrally rotated.

The socket 40 has a cylindrical portion that is formed on one side thereof and rotatably inserted into the center boss 11 of the external gear 10. The socket 40 has a through-hole (passing through the cylindrical portion). One end of a shaft is spline-coupled to the through-hole and the other end of the shaft is connected to an output shaft of a motor.

The pair of wedges 50 and the cam sliver 51 to support the wedges 50 are installed between the center boss 11 of the external gear 10 and the bush 30 of the internal gear 20.

Each of the wedges 50 has an arc shape corresponding to a quarter circle as a whole, and has a width increased gradually from bottom to top. That is, both wedges 50 are configured such that their upper ends facing each other have a large width and their lower ends spaced apart from each other have a small width.

The cam sliver 51 has a substantially semicircular shape, and is slidably in contact with the outer peripheral surface of the center boss 11. The wedges 50 are slidably in contact with the outer peripheral surface of the cam sliver 51, and the lower ends of the cam sliver 51 are bent radially outward to support the lower ends of the wedges 50.

By virtue of such a simple shape, the cam sliver 51 may support the wedges 50 to smoothly transmit the rotational force of the socket 40 to the wedges 50.

The lower ends of the cam sliver 51 are supported by a push part 41 protruding from one side of the socket 40, and are pushed by the push part 41 when the socket 40 is rotated so that the cam sliver 51 and the wedges 50 are rotated.

The spring 80 has a circular ring shape that is open at one side thereof, and is installed on one side of the socket 40. Both ends of the spring 80 are bent and extended toward the wedges 50 to always push the upper ends of both wedges 50 in a direction away from each other. That is, the pair of wedges 50 are supported in a state in which the gap between the wedges 50 is elastically deformed in the direction of rotation thereof by the spring 80.

The cover plate 60 is inserted into and welded to the inner diameter portion of the internal gear 20 to cover the spring 80, the socket 40, and the like. Thus, the cover plate 60 prevents the outward separation of components, such as the wedges 50, the cam sliver 51, the socket 40, and the spring 80, installed in the internal gear 20.

The guide ring 70 is fixed to the outer periphery of the external gear 10, and covers the boundary between the external gear 10 and the internal gear 20 (the engagement of the teeth 12 and 21 of both gears) to prevent the separation of the internal gear 20 from the external gear 10.

Meanwhile, the center boss 11 of the external gear 10 has a multi-stage structure that includes an upper first end 11a having a relatively small outer diameter, and a lower second end 11b having a relatively larger outer diameter than the first end 11a (wherein, the upper and lower sides are distinguished based on FIG. 4).

The first and second ends 11a and 11b are distinguished by the difference in outer diameter, and have a single through-hole with a constant inner diameter formed therein. The through-hole is a portion into which the cylindrical portion of the socket 40 is inserted and about which the socket 40, the cam sliver 51, and the wedges 50 are rotated.

As illustrated in FIG. 4, the cam sliver 51 is slidably in contact with the outer peripheral surface of the first end 11a. The cam sliver 51 is formed to have a height smaller than or equal to the first end 11a so as not to interfere with the socket 40. Accordingly, the cam sliver 51 does not protrude upward and outward from the first end 11a (based on FIG. 4), namely, upward and outward from the center boss 11.

In order to cope with the multi-stage structure of the center boss 11 consisting of the first and second ends 11a and 11b, the wedges 50 are formed to have a height smaller than or equal to the sum of the height of the cam sliver 51 and the height of the second end 11b. Thus, the entire inner peripheral surfaces of the wedges 50 are slidably in contact with the outer peripheral surface of the cam sliver 51 and the outer peripheral surface of the second end 11b, and do not protrude upward and outward from the first end 11a, namely, the center boss 11 so as not to interfere with the socket 40.

As described above, the center boss 11 has the multi-stage structure that includes the first end 11a, having the same thickness as the conventional center boss, and the second end 11b having a larger diameter than the first end 11a.

Accordingly, when an external force is applied to the recliner, the surface pressure acting on the center boss 11 through the wedges 50 and the cam sliver 51 (in a direction orthogonal to the central axis of the center boss) is distributed and applied to the second end 11b and the first end 11a. That is, the above-mentioned multi-stage structure is advantageous for distributing loads, thereby reducing the magnitude of internal stress. Since the center boss 11 according to the present disclosure has the multi-stage structure that is advantageous for distributing the compressive surface pressure as described above, it is possible to prevent the deformation of the center boss 11 even when a strong external force is applied thereto.

It can be seen that the multi-stage structure is formed in a manner that the thickness of a portion of the center boss 11 is increased to form the second end 11b so that the strength of the base end of the center boss 11 is increased. However, the present disclosure uses the multi-stage structure in which there is a portion that does not increase in thickness, for example, the first end 11a. Therefore, it is possible to secure the installation space of the center boss 11 without reducing the thickness of the cam sliver 51.

It is possible to secure the strength required for the center boss 11 by the above-mentioned multi-stage structure. Therefore, there is no need to perform heat treatment on the external gear 10, including the center boss 11, for increasing the strength thereof. Consequently, the cost to manufacture the recliner is significantly reduced through removal of the heat treatment process. When the heat treatment process is removed as described above, thermal deformation in products due to the heat treatment does not occur, thereby facilitating the dimensional control of components.

In addition, since the strength required for the center boss 11 is secured by the multi-stage structure, there is no need to manufacture the external gear 10 from special alloy steel having excellent strength.

FIG. 5 illustrates a state of generation of stress of the external gear 10 included in the recliner according to the present disclosure, and illustrates the magnitude of the stress that increases from blue to red through yellow. It can be seen that, during the operation of the recliner, a strong stress is generated in the teeth 12 engaged with the internal gear 20 (represented as red) and a predetermined amount of stress is also generated in the center boss 11.

As a result of comparing the above state of generation of stress with that of the conventional external gear 10 illustrated in FIG. 2, in the present disclosure, the intensity of the stress generated in the center boss 11 is mostly represented as blue and is partially represented as weak green compared to that illustrated in FIG. 2. Accordingly, it can be seen that a much smaller amount of stress is generated in the center boss 11 of the external gear 10 according to the present disclosure. Therefore, it can be seen that the recliner according to the present disclosure has the improved deformation prevention performance of the center boss 11.

FIG. 6 is a test result for verifying the strength of the recliner, wherein (a) is a photograph of the internal gear 20 and (b) is a photograph of the external gear 10.

The test is performed by applying a strong external force to the assembled recliner and then measuring whether the center boss 11 of the external gear 10 is deformed.

A test of applying a moment of about 2,500 to 2,600 Nm to the recliner is repeatedly performed. As a result, as illustrated in FIG. 6, it can be seen that the compression deformation of the center boss does not occur even though a strong external force enough to damage both teeth 12 and 21 of the external and internal gears 10 and 20 is applied to the recliner.

As is apparent from the above description, in the present disclosure, the center boss is formed in the multi-stage structure to smoothly distribute the compressive surface pressure acting on the center boss. Accordingly, the center boss can have sufficient strength without thickening the center boss, performing heat treatment on the center boss, or using special alloy steel with strong strength.

Therefore, it is possible to resolve a reduction in installation space of other components caused by increasing the thickness of the center boss.

In addition, since the thickness of the center boss is not increased, it is possible to easily process the shape of the center boss without defects by burring.

In addition, since the heat treatment process performed to secure the strength of the center boss can be removed, the cost to manufacture the external gear, namely, the recliner can be reduced.

In addition, since there is no need to manufacture the external gear from expensive special alloy steel, the cost to manufacture the recliner can be reduced.

While the present disclosure has been described with respect to the embodiments illustrated in the drawings, it will be obvious to those skilled in the art that such embodiments are provided by way of example only. It will be understood by those skilled in the art that various modifications and other equivalent embodiments may be made without departing from the spirit and scope of the disclosure as defined in the following claims. Therefore, the true technical protection scope of the present disclosure should be defined by technical concepts of the appended claims.

What is claimed is:

1. A vehicle seat recliner comprising:
   external and internal gears inscribed with each other, the external gear including a center boss having a multi-stage structure with a stepped outer peripheral surface, the stepped outer peripheral surface having a first end and a second end, the second end having an outer diameter larger than an outer diameter of the first end;
   a socket rotatably inserted into the center boss of the external gear and connected to a shaft rotated by a motor;
   a pair of wedges installed between the center boss of the external gear and the internal gear to mutually constrain them or release a constrained state thereof; and
   a cam sliver installed between the first end of the stepped outer peripheral surface of the center boss and the wedges, the cam sliver being slidable only on an outer peripheral surface of the first end of the stepped outer peripheral surface of the center boss,
   wherein entire inner peripheral surfaces of the wedges are slidable on both a radial outer peripheral surface of the cam sliver and a radial outer peripheral surface of the second end of the stepped outer peripheral surface of the center boss.

2. The vehicle seat recliner according to claim 1, wherein each of the cam sliver and the wedges has a length that does not protrude outward from the tip of the first end.

3. The vehicle seat recliner according to claim 2, wherein the cam sliver has lower ends bent radially outward to support lower ends of the wedges.

4. The vehicle seat recliner according to claim 1, further comprising a circular ring-shaped spring that is open at one side thereof and installed on one side of the socket, both ends of the spring being bent and extended to be inserted between the pair of wedges so that the spring pushes the wedges in a direction away from each other.

* * * * *